US011147289B2

(12) United States Patent
San Miguel et al.

(10) Patent No.: US 11,147,289 B2
(45) Date of Patent: Oct. 19, 2021

(54) FLAVORED FROZEN BEVERAGE DISPENSER

(71) Applicant: The Coca-Cola Company, Atlanta, GA (US)

(72) Inventors: Rafael I. San Miguel, Atlanta, GA (US); Arthur G. Rudick, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 246 days.

(21) Appl. No.: 16/535,980

(22) Filed: Aug. 8, 2019

(65) Prior Publication Data

US 2019/0357562 A1 Nov. 28, 2019

Related U.S. Application Data

(63) Continuation of application No. 14/210,854, filed on Mar. 14, 2014, now abandoned.

(60) Provisional application No. 61/792,260, filed on Mar. 15, 2013.

(51) Int. Cl.
*A23G 9/04* (2006.01)
*A23G 9/12* (2006.01)
*A23G 9/28* (2006.01)

(52) U.S. Cl.
CPC .............. *A23G 9/045* (2013.01); *A23G 9/12* (2013.01); *A23G 9/282* (2013.01)

(58) Field of Classification Search
CPC .. F25C 1/147; A23G 9/16; A23G 9/12; A23G 9/282; A23G 9/045; A23G 9/00; A23G 9/04; A23G 9/086; A23G 9/10; A23G 9/103; A23G 9/106; A23G 9/30; B67D 1/0043; B67D 1/0047; B67D 1/07; B67C 3/001; B67C 3/002; B67C 3/004
USPC ................... 222/145.5, 145.6, 148, 1, 129.1; 426/231, 519, 524; 141/89, 90, 91
See application file for complete search history.

(56) References Cited

U.S. PATENT DOCUMENTS

| | | | | |
|---|---|---|---|---|
| 2,426,368 A | * | 8/1947 | Mayne | A23G 9/16 62/268 |
| 4,438,634 A | * | 3/1984 | Merle | F25C 1/147 366/168.1 |
| 4,964,542 A | | 10/1990 | Smith | |
| 2002/0129616 A1 | * | 9/2002 | Jones | A23L 3/361 62/378 |
| 2003/0130762 A1 | | 7/2003 | Tomassi | |
| 2007/0205220 A1 | | 9/2007 | Rudick et al. | |

FOREIGN PATENT DOCUMENTS

| | | |
|---|---|---|
| EP | 1205891 A1 | 5/2002 |
| WO | 2005120243 A1 | 12/2005 |
| WO | 2009059405 A1 | 5/2009 |

OTHER PUBLICATIONS

Pearce, Stephanie; Examination report No. 1 for standard patent application; dated May 21, 2019; pp. 1-4; IP Australia, Woden ACT 2606, Australia.

* cited by examiner

*Primary Examiner* — Vishal Pancholi
*Assistant Examiner* — Robert K Nichols, II

(57) ABSTRACT

Embodiments of the invention may provide a frozen beverage dispenser capable of dispensing multiple frozen beverage flavors.

19 Claims, 4 Drawing Sheets

FLAVORED FROZEN BEVERAGE DISPENSER

CROSS-REFERENCE TO RELATED APPLICATIONS

The present application is a Continuation Application of U.S. patent application Ser. No. 14/210,854, filed 14 Mar. 2014, which claims priority to U.S. Patent Application No. 61/792,260, filed 16 Mar. 2013, entitled "Flavored Frozen Beverage Dispenser," of which the disclosures are incorporated herein in their entirety for all purposes.

BACKGROUND

Traditional frozen beverage dispensers have been limited to dispensing one or two frozen beverage flavors. A need exists to provide frozen beverage dispensers having the capability to dispense several frozen beverage flavors while still adhering to, for example, spatial constraints.

RELATED APPLICATIONS

Commonly owned U.S. patents and Patent Application Publications include:

U.S. Patent Application Publication No. 2007/0271944, titled "Reduced Calorie Frozen Beverage";

U.S. Patent Application Publication No. 2003/0224005, titled "Non-Caloric Frozen Carbonated Beverage";

U.S. Pat. No. 7,870,749, titled "Beverage Dispensing Apparatus and Method for Beverage Dispensing";

U.S. Patent Application Publication No. 2007/0205220, titled "Juice Dispensing System";

U.S. Patent Application Publication No. 2007/0267441, titled "Dispenser for Beverages Including Juices";

U.S. Patent Application Publication No. 2009/0014464, titled "Clean-In-Place System for Beverage Dispensers";

U.S. Patent Application Publication No. 2012/0228328, titled "Dispenser for Beverages Having a Rotary Micro-Ingredient Combination Chamber"; and U.S. Patent Application Publication No. 2012/0230148, titled "Dispenser for Beverages Having an Ingredient Mixing Module".

Each of the above referenced Patent Application Publications and Patents is incorporated by reference, in its entirety, into this disclosure.

BRIEF DESCRIPTION OF THE DRAWINGS

The accompanying drawings, which are incorporated in and constitute a part of this disclosure, illustrate various embodiments of the present invention. They may not be drawn to scale. In the drawings.

DETAILED DESCRIPTION

Figure 1:
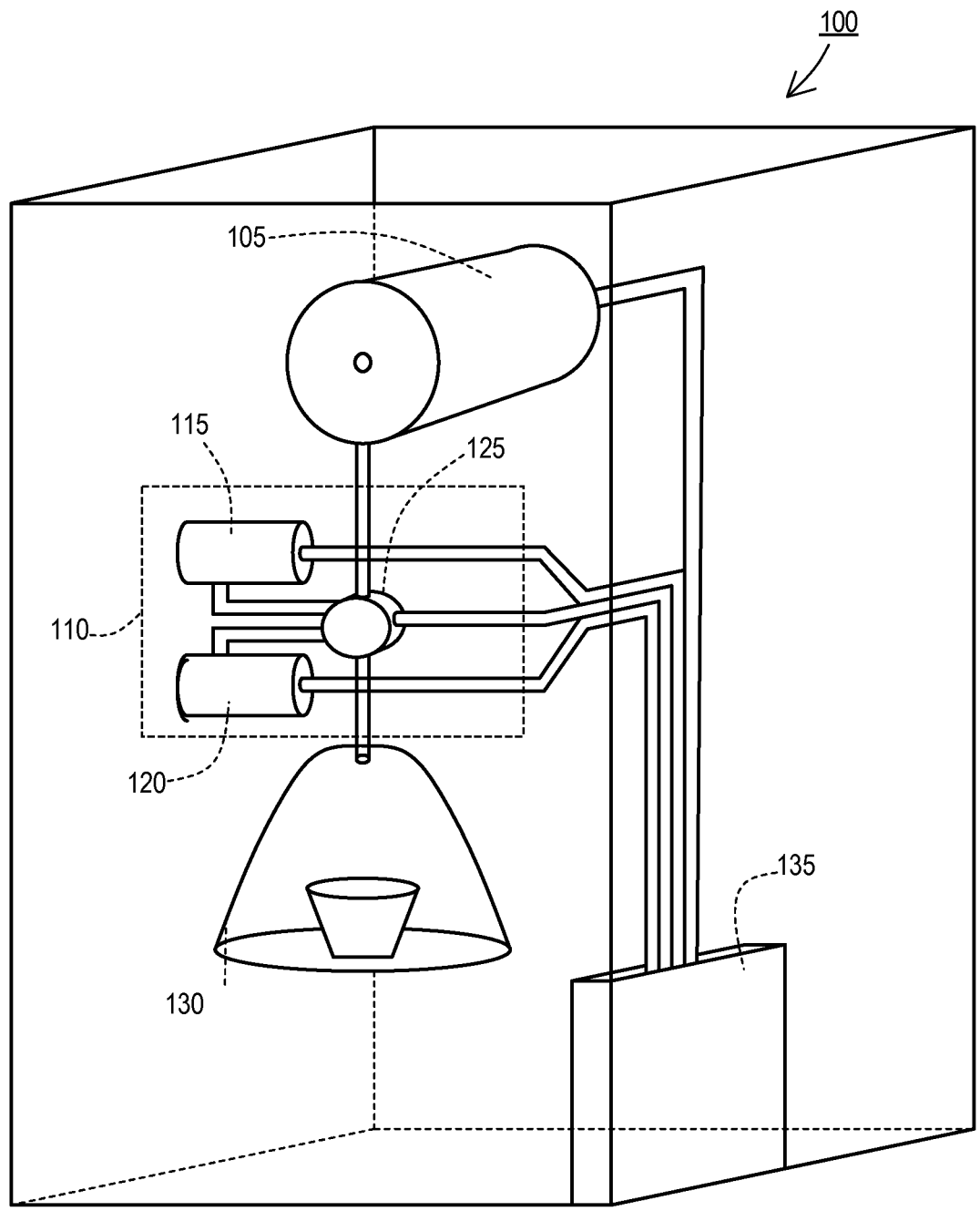
FIG. 1 illustrates one embodiment of a frozen beverage dispenser.

The following detailed description refers to the accompanying drawings. Wherever possible, the same reference numbers are used in the drawings and the following description to refer to the same or similar elements. While embodiments of the invention may be described, modifications, adaptations and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Embodiments of the invention may provide a frozen beverage dispenser capable of dispensing multiple frozen beverage flavors. FIG. 1 illustrates one embodiment of a frozen beverage dispenser 100. Frozen beverage dispenser 100 may comprise a frozen carbonated or un-carbonated beverage (FB) barrel 105 for producing and storing a frozen slush or slurry. FB barrel 105 will be described in greater detail with references to FIG. 2-3a. In various embodiments of the invention, the frozen slush may comprise an unflavored or flavorless slush base (i.e. "white paint") in order to flavor the frozen slush, micro-ingredients and/or macro-ingredients may be mixed in with the frozen slush.

Mixing may occur in a mixing chamber 110 of frozen beverage dispenser 100. Consistent with embodiments of the invention, mixing chamber 110 may comprise, but not be limited to, a macro-ingredient component 115 and a micro-ingredient component 120. The macro-ingredient component 115 may include one or more macro-ingredient cartridges installed therein, each of the cartridges may include a different macro-ingredient. In some embodiments, two or more macro-ingredient cartridges may include the same macro-ingredient. In some embodiments, the macro-ingredient component 115 may receive a macro-ingredient pumped through a line or otherwise delivered to the macro-ingredient component 115 from an external source. Similarly, the micro-ingredient component 120 may include one or more micro-ingredient cartridges installed therein, each of the cartridges may include a different micro-ingredient. In some embodiments, two or more micro-ingredient cartridges may include the same micro-ingredient. In some embodiments, the micro-ingredient component 120 may receive a micro-ingredient pumped through a line or otherwise delivered to the micro-ingredient component 120 from an external source. Macro-ingredients from macro-ingredient component 115 and micro-ingredients from micro-ingredient component 120 may be mixed into the frozen slush by mixer 125. In certain embodiments, mixer 125 may comprise a brushless mixer. However, other mixers may be used. Mixing chamber 125 may be operated by a computing device to produce specified mixtures of frozen slush, macro-ingredients, and/or micro-ingredients. In some embodiments, only micro-ingredients may be added to the frozen slush.

Commonly owned U.S. Patent Application Publication No. 2012/0228328, titled "Dispenser for Beverages Having a Rotary Micro-Ingredient Combination Chamber," and U.S. Patent Application Publication No. 2012/0230148, titled "Dispenser for Beverages Having an Ingredient Mixing Module," may disclose mixing, dispensing, and draining methods, systems, and mechanisms that may be adapted into various embodiments of the present invention. Mixing chamber 110 will be described in greater detail with reference to FIGS. 3a-4d.

Once the frozen slush is mixed in with macro-ingredients and/or micro-ingredients to, for example, flavor the frozen slush, the flavored slush may be dispensed from dispensing chamber 130. Even after having dispensed the flavored slush, mixer 125 may still contain residue of the flavored slush. The residue may cause "flavor-carryover" for any subsequent mixtures made by mixer 125. Accordingly, there this residue may be removed from mixer 125 prior to mixing subsequent frozen slush flavors.

Embodiments of the invention may remove the residue by flushing mixer 125 with water, agitating mixer 125, and then using a flush diverter to divert the flushed water to a drain. Commonly owned U.S. Pat. No. 7,87,749, titled "Beverage Dispensing Apparatus and Method for Beverage Dispensing." U.S. Patent Application Publication No. 2007/0205220, titled "Juice Dispensing System," U.S. Patent Application Publication No. 2007/0267441, titled "Dispenser for Beverages Including Juices," and U.S. Patent Application Publication No. 2009/0014154, titled "Clean-In-Place System for Beverage Dispensers," may disclose mixing, dispensing, and draining methods, systems, and mechanisms that may be adapted into various embodiments of the present invention.

Still consistent with embodiments of the invention, the residue may be removed by running, for a brief period of time, the un-flavored slush base through the mixer 125 without mixing any additional macro-ingredients or micro-ingredients. Mixer 125 may be agitated when the un-flavored slush base is received and then it may dispense the slush into, for example, dispensing chamber 130. In this way, the un-flavored slush base serves to flush the residue out of mixer 125.

Embodiments of the present invention may further comprise gateway compartment 135. Gateway compartment 135 may serve to channel drainage from the flush diverter to an external system. Moreover, gateway compartment 135 may also channel raw material for producing the frozen slush, macro-ingredients, and micro-ingredients from an external storage to FB barrel 105, macro-ingredient component 115, and micro-ingredient component 120, respectively. In this way, the ingredients needed to produce a frozen slush beverage may be fed into frozen beverage dispenser 100 from a remote location.

Figure 2:
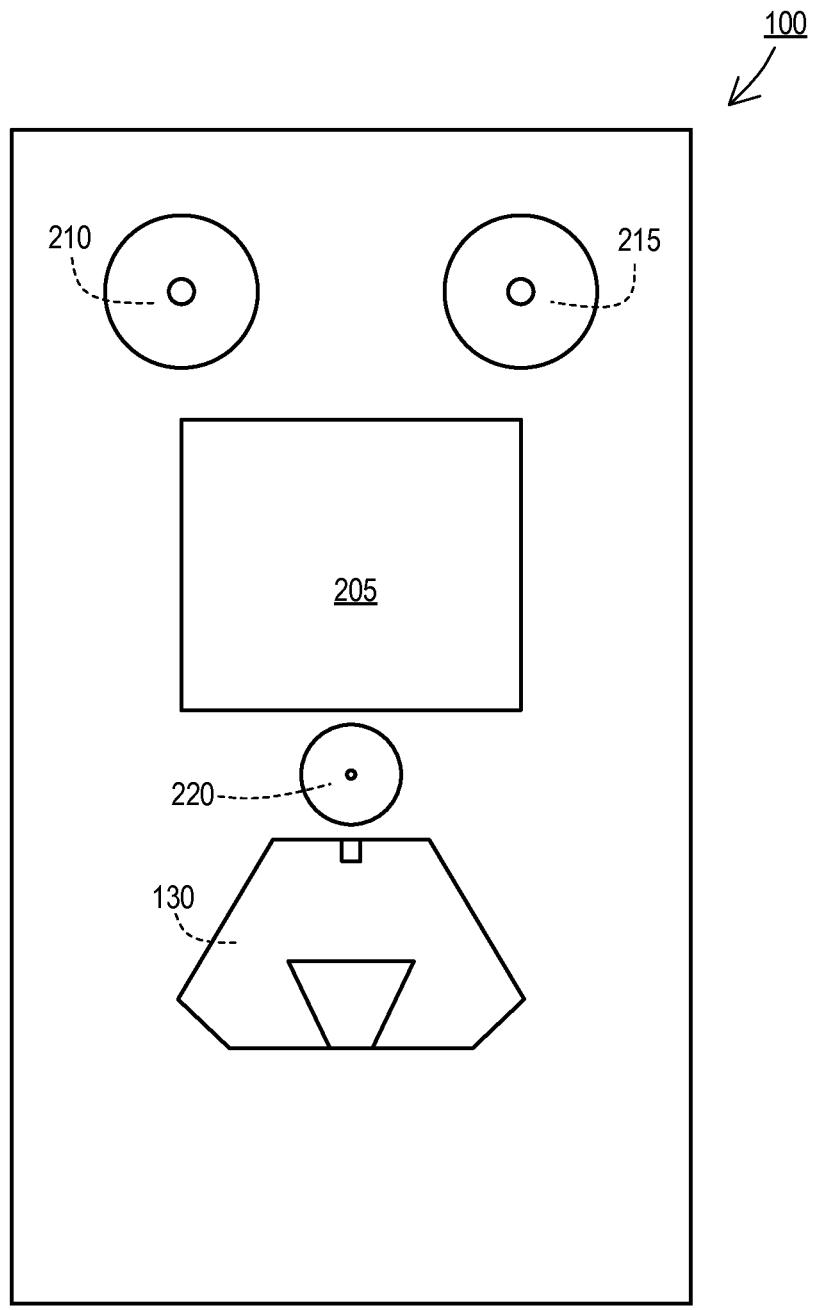
FIG. 2 illustrates another embodiment of the frozen beverage dispenser.

FIG. 2 illustrates a from view of an embodiment of frozen beverage dispenser 100. Consistent embodiments of the invention, frozen beverage dispenser 100 may comprise a touch screen computing device 205. In some embodiments, other forms of user interfaces may be substituted for the touch screen computing device 205. Touch screen computing device 205 may provide frozen beverage flavor selections. When a selection of a flavored frozen beverage is received, touch screen computing device 205 may signal the computing device of mixing chamber 110 with the selection. In various embodiments, the computing device of mixing chamber 110 and the touch screen computing device may be combined into a single computing device. Mixing chamber 110 may then be operated to produce the mixture specified for the selected frozen beverage type.

In this embodiment, the touch screen computing device 205 includes one or more processing units and computer readable media. Computer readable media includes physical memory such as volatile memory (such as RAM), non-volatile memory (such as ROM, flash memory, etc.) or some combination thereof. Additionally, the computing device can include mass storage (removable and/or non-removable) such as a magnetic or optical disks or tape. An operating system, such as Linux or Windows, and one or more application programs can be stored on the mass storage device. The computing devices can include input devices (such as a touch screen, or a keyboard and mouse) and output devices (such as a monitor and printer).

For example, the touch screen computing device 205 can be programmed to receive input from the user. Based upon that input, the touch screen computing device 205 is programmed to execute instructions stored on the computer readable media to control the frozen beverage dispenser 100 to make the desired frozen beverage selected by the user, as described herein.

Frozen beverage dispenser 100 may further comprise a first glass window 210 and a second glass window 215. As illustrated in FIG. 2, certain embodiments of the invention may comprise more than one FB barrel. Glass windows 210 and 215 may be included a frozen beverage dispenser 100 to expose the different FB barrels, a FB barrel may be used to produce and store frozen slush from raw materials. The raw materials may comprise water and an additive. The additive may be mixed with the water to cause a freezing point depression suitable to produce a desirable consistency in the frozen slush.

Different additives may be used to produce the frozen slush. For instance, sugar or high fructose corn syrup (HFCS) may serve as an additive. Alternatively, a low calorie sweetener may serve as an additive. Consistent with embodiments of the invention, frozen beverage dispenser 100 comprise a first FB barrel having a frozen slush produced with a first additive and a second FB barrel having a frozen slush produced with a second additive. In some embodiments, the first FB barrel may have a nutritive additive with a first caloric value per serving and the second FB barrel may have a non-nutritive or low nutritive additive with a zero caloric value or a lower caloric value than the first caloric value. Based on selections received by touch screen computing device 205, a corresponding frozen slush may be produced using the appropriate FB barrel. Commonly owned U.S. Patent Application Publication No. 2007/0271944, titled "Reduced Calorie Frozen Beverage," and U.S. Patent Application Publication No. 2003/0774095, titled "Non-Caloric Frozen Carbonated Beverage," may disclose frozen slush production and storage methods, systems, and mechanisms that may be adapted into various embodiments of the present invention.

Frozen beverage dispenser 100 may also comprise a third glass window 220. Third glass window 220 may expose a portion of mixing chamber 110, such as, for example, mixer 125. In this way, an individual may observe his frozen beverage selection as it is mixed before and/or as it is dispensed through dispensing chamber 130.

Figure 3A:
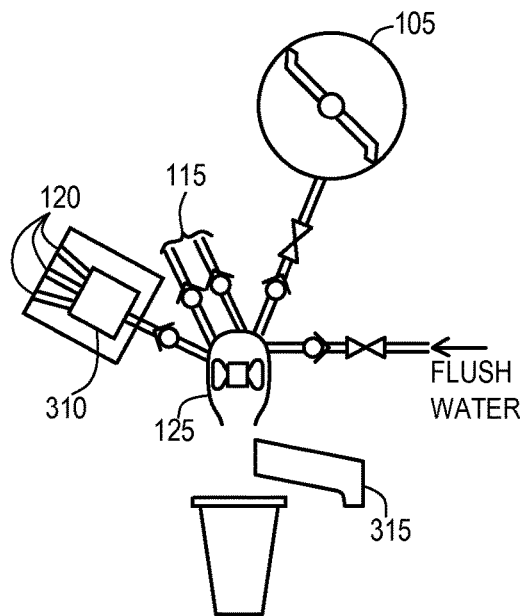
FIGS. 3a-3d illustrate embodiments of a mixing chamber for the frozen beverage dispenser.
Figure 3B:
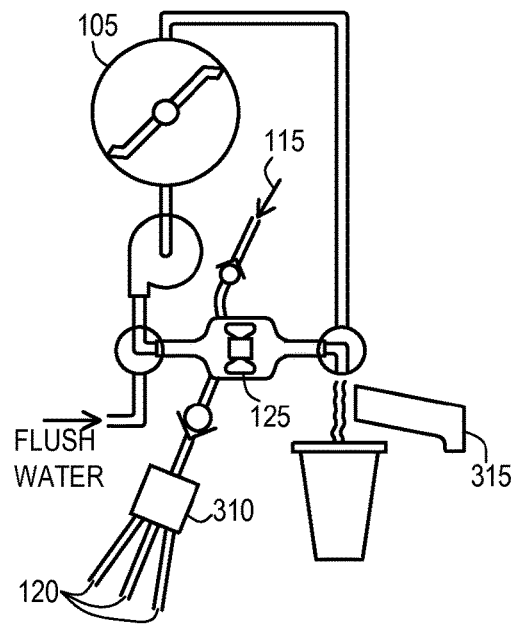
Figure 3C:
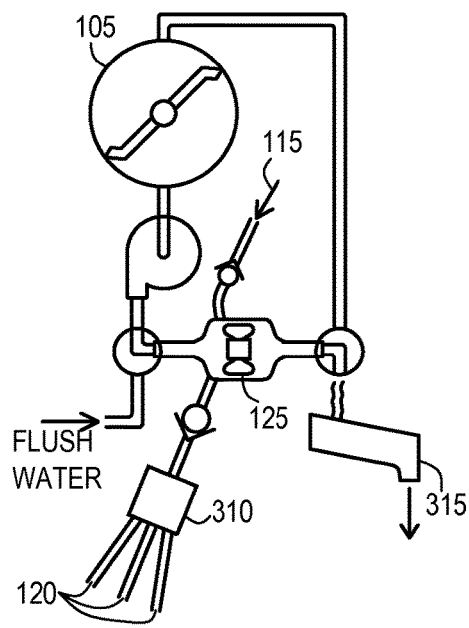
Figure 3D:
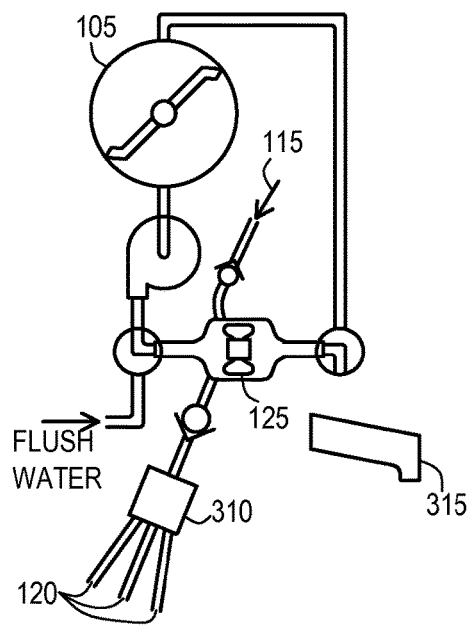

FIG. 3a illustrates an embodiment of mixing chamber 110. FIG. 3b illustrates an embodiment of mixing chamber 110 in a dispense configuration. FIG. 3c illustrates an embodiment of mixing chamber 110 in a flush configuration. FIG. 3d illustrates an embodiment of mixing chamber 110 in a recirculate configuration.

Referring to FIG. 3a, FB barrel 105 may receive a water and additive mixture at, for example, room temperature. The interior surface of FB barrel 105 may then be cooled. As the mixture interacts with the cool interior surface of the FB barrel 105, it begins to cool and adhere to the surface. A motorized auger may then scoop the cooled mixture from the interior surface of FB barrel 105 and push it towards the center of FB barrel 105. In this way, the mixture is continuously cooled and mixed into a frozen slush. Other means for producing the frozen slush may be implemented, and the present invention is not limited to the aforementioned frozen slush production process.

The frozen slush produced by FB barrel 105 is passed to the mixer 125. As mentioned above, mixer 125 may be a brushless mixer similar to the ones shown in FIG. 3a. Mixer 125 may also receive ingredients from macro-ingredient component 115 and micro ingredient component 120. Macro-ingredient component 120 may comprise, for example, various cartridges including feeds of HFCS, juice, milk, yogurt, fruit puree, fruit pulp, fruits chunks, or various other textural elements. The macro-ingredients may be concentrated ingredients having reconstitution ratios of about 3:1 to about 6:1 or higher. Any number of macro-ingredients may be added to mixer 125 from macro-ingredient component 120.

Micro-ingredient component 120 may be used to flavor the frozen slush. The micro-ingredients may comprise, but not be limited to, for example, cartridges comprising a sweetener, various flavors, and alcohol. From these cartridges, various micro-ingredients may be fed into a ceramic rotary micro-ingredient combination device 310, then subsequently enter mixer 125.

Micro-ingredient component 120 may include cartridges for providing any number of ingredients Including, but not limited to, sweetened beverage bases or beverage syrups, sweetened flavors or flavor syrups, unsweetened beverage bases, unsweetened beverage base component (such as the acid, acid-degradable and non-acid portions of a beverage base), unsweetened flavors, natural and artificial flavors, flavor additives, natural and artificial colors, nutritive or non-nutritive natural or artificial sweeteners, additives for controlling tartness (e.g., citric acid, potassium citrate, etc.), functional additives such as vitamins, minerals, or herbal extracts, nutraceuticals, or medicaments. The beverage micro-ingredients may have reconstitution ratios from about 10:1, 20:1, 30:1, or higher with many having reconstitution ratios of 50:1 to 300:1. The viscosities of the ingredients may range from about 1 to about 100 centipoise.

As mentioned above, the frozen slush may be an unflavored slush base. By adding the mixed micro-ingredients and macro-ingredients (as derived from a selection received at touch screen computing device 205), the otherwise unflavored slush base may acquire a flavor and texture.

Once the mixed micro-ingredients and/or macro-ingredients are added to the frozen slush, the now flavored frozen slush may be dispensed as illustrated in FIG. 3b via dispensing chamber 130. The residue in mixer 125, leftover from the mixture, may be flushed with an input of water and drained via flush diverter 315 as illustrated in FIG. 3c. Flush diverter 315 may also be configured to flush slush that has melted during the mixing process. In this way, only frozen slush may be dispensed. In other embodiments of the invention, the residue may be flushed from mixer 125 by running the unmixed frozen slush through mixer 125 for a brief period of time after each dispense. In this way, the residue may be mixed with the frozen slush and subsequently dispensed, thereby cleansing mixer 125 of the residue.

Figure 4A:
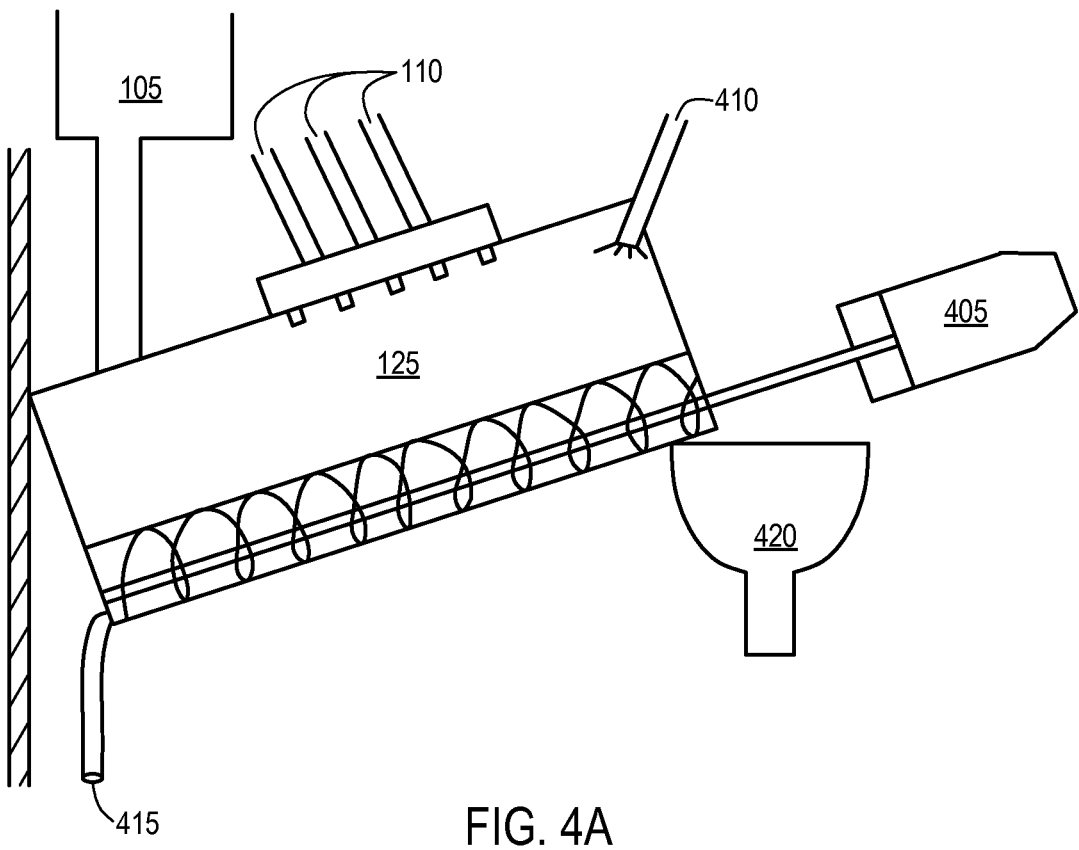
FIGS. 4a-4c illustrate other embodiments of a mixing chamber for the frozen beverage dispenser.
Figure 4B:
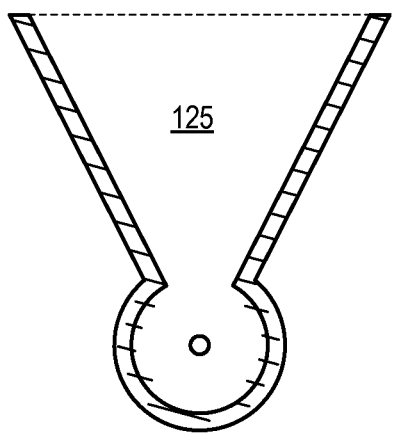
Figure 4C:
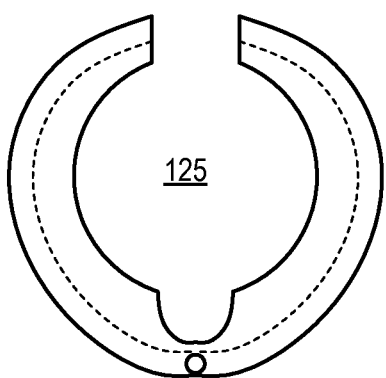

FIG. 4a illustrates another embodiment of mixing chamber 125. Mixing chamber 125 may comprise open trough auger driven mixer 125 receiving feed from FB barrel 105, macro-ingredients component 115, and micro ingredients component 120. Mixer 125 may be driven by a motor 405. The mixer 125 may be inclined to ensure a thorough mixture of the frozen slush, macro-ingredients and/or micro-ingredients, as the auger rotates to propagate the mixture up through mixer 125. Eventually, the mixture is forced out of mixer 125 and into a funnel 420 leading to dispensing chamber 130. The residue of the mixture may be cleared by spraying wafer from nozzle 410. The water may run down the mixer and be drained through a drainage tubing 415. Slush that has melted during the mixing process may also be drained through drainage tubing 415 so as not to be dispensed. In this way, only frozen slush may be dispensed. FIGS. 4b and 4c illustrate different embodiments that may be used for the base of the mixer 125. In each of FIGS. 4b and 4c, there is a trough at the bottom of the mixing chamber 125 within which the auger is placed. Having a trough at the bottom of the mixing chamber promotes delivery of all of the ingredient to the auger and also promotes thorough mixing of the ingredients together. In some embodiments, the cross-section of the mixing chamber 125 may simply be a regular circle or oval.

The invention claimed is:

1. A method comprising:
   receiving frozen slush at a lower end of a mixing chamber;
   mixing the frozen slush while simultaneously carrying the frozen slush from the lower end of the mixing chamber to a higher end of the mixing chamber;
   introducing at least one ingredient into the frozen slush while the frozen slush is being carried from the lower end to the higher end to create a mixture;
   dispensing the mixture out of the mixing chamber proximate the higher end of the mixing chamber; and
   flushing the mixing chamber by spraying water into the mixing chamber and draining the water away from the mixing chamber at the lower end.

2. The method of claim 1, wherein dispensing the mixture out of the mixing chamber comprises carrying the mixture to a funnel leading to a dispensing chamber.

3. The method of claim 1, wherein draining the water comprises draining the water through drainage tubing located proximate the lower end of the mixing area.

4. The method of claim 1, wherein mixing the frozen slush while simultaneously carrying the frozen slush from the lower end of the mixing chamber to a higher end of the mixing chamber comprises employing an auger to carry the frozen slush to the higher end of the mixing chamber.

5. The method of claim 4, wherein employing an auger to carry the frozen slush to the higher end of the mixing chamber comprises operating the auger in a trough at a bottom of the mixing chamber.

6. The method of claim 5, wherein flushing the mixing chamber comprises spraying the water into a top of the mixing chamber opposite the bottom of the mixing chamber.

7. The method of claim 5, wherein receiving frozen slush at a lower end of a mixing chamber further comprises receiving frozen slush at a top of the mixing chamber opposite the bottom of the mixing chamber.

8. The method of claim 5, wherein introducing at least one ingredient into the frozen slush comprises receiving one or more macro ingredients and one or more micro ingredients via a top of the mixing chamber opposite the bottom of the mixing chamber.

9. A frozen beverage dispenser comprising:
   a mixing chamber having a first end higher than a second end, the mixing chamber further comprising:
      a first inlet proximate the second end of the mixing chamber configured to receive a frozen slush; and
      an auger configured to mix and carry the frozen slush from the second end of the mixing chamber toward the first end of the mixing chamber;
   drainage tubing proximate the second end configured to drain liquid from the mixing chamber;
   at least one water nozzle configured to spray water into the mixing chamber; and
   a frozen beverage barrel located remotely from the mixing chamber.

10. The frozen beverage dispenser of claim 9, further including one or more secondary inlets to the mixing chamber configured to allow at least one micro-ingredient and at least one macro ingredient to be introduced to the frozen slush in the mixing chamber.

11. The frozen beverage dispenser of claim 9, wherein the mixing chamber includes a rounded trough at a bottom of the mixing chamber, the rounded trough housing the auger.

12. A system comprising:
- a barrel for producing a frozen slush or slurry;
- a mixing chamber including:
  - a first end and a second end, wherein the mixing chamber is tilted such that the first end is higher than the second end;
  - an open trough auger configured to mix and carry the frozen slush or slurry toward the first end of the mixing chamber;
  - a first inlet proximate the second end of the mixing chamber configured to receive the frozen slush or slurry from the barrel;
- drainage tubing proximate the second end configured to drain liquid from the mixing chamber; and
- a water nozzle proximate the first end configured to spray water into the mixing chamber.

13. The system of claim 12, further comprising:
- a funnel located proximate the first end of the mixing chamber to catch the slush or slurry carried by the open trough auger and deliver the slush or slurry to a dispensing chamber.

14. The system of claim 12, further comprising one or more of:
- a macro ingredients component to deliver one or more macro ingredients to the mixing chamber;
- a micro ingredients component to deliver one or more micro ingredients to the mixing chamber.

15. The system of claim 12, further comprising:
- a motor to drive the open trough auger.

16. The system of claim 12, wherein the mixing chamber includes a rounded trough at a bottom of the mixing chamber, the rounded trough housing the open trough auger.

17. The system of claim 16, wherein the water nozzle is located at a top of the mixing chamber opposite the bottom of the mixing chamber.

18. The system of claim 16, wherein the first inlet is located at a top of the mixing chamber opposite the bottom of the mixing chamber.

19. The system of claim 16, wherein a macro ingredients component and a micro ingredients component are located at a top of the mixing chamber opposite the bottom of the mixing chamber.

* * * * *